United States Patent [19]
Grob et al.

[11] Patent Number: 5,881,368
[45] Date of Patent: Mar. 9, 1999

[54] METHOD AND APPARATUS OF POWER CONTROL IN A CDMA DISPATCH SYSTEM

[75] Inventors: Matthew S. Grob, La Jolla; Yu-Dong Yao, San Diego; Eric J. Lekven, Carlsbad, all of Calif.

[73] Assignee: QUALCOMM Incorporated, San Diego, Calif.

[21] Appl. No.: 660,618

[22] Filed: Jun. 6, 1996

[51] Int. Cl.$^6$ .................................................. H04B 1/00
[52] U.S. Cl. ............................................ 455/69; 455/522
[58] Field of Search ............................ 455/69, 522, 509, 455/450, 127, 572, 574, 38.3; 370/329, 341

[56] References Cited

U.S. PATENT DOCUMENTS

| | | | |
|---|---|---|---|
| 4,833,701 | 5/1989 | Comroe et al. | 455/509 |
| 4,901,307 | 2/1990 | Gilhousen et al. | 370/320 |
| 5,095,529 | 3/1992 | Comroe et al. | 455/16 |
| 5,265,119 | 11/1993 | Gilhousen et al. | 455/522 X |
| 5,267,261 | 11/1993 | Blakeney, II et al. | 370/332 |
| 5,325,432 | 6/1994 | Gardeck et al. | 380/21 |
| 5,369,781 | 11/1994 | Comroe et al. | 455/15 |
| 5,387,905 | 2/1995 | Grube et al. | 340/825.52 |
| 5,420,909 | 5/1995 | Ng et al. | 455/426 |
| 5,450,405 | 9/1995 | Maher et al. | 370/261 |
| 5,463,617 | 10/1995 | Grube et al. | 370/261 |
| 5,465,391 | 11/1995 | Toyryla | 455/422 |
| 5,473,605 | 12/1995 | Grube et al. | 370/261 |
| 5,491,835 | 2/1996 | Sasuta et al. | 455/509 |
| 5,511,232 | 4/1996 | O'Dea et al. | 455/519 |
| 5,513,381 | 4/1996 | Sasuta | 455/509 |
| 5,542,108 | 7/1996 | Sasuta | 455/520 |
| 5,594,948 | 1/1997 | Talarmo et al. | 455/518 |
| 5,634,197 | 5/1997 | Paavonen | 455/512 |

FOREIGN PATENT DOCUMENTS 0682417   11/1995   European Pat. Off. .

OTHER PUBLICATIONS

Frederic Gourgue, "Air Interface of the Future European Fully Digital Trunk Radio System", *Personal Communication—Freedom Through Wireless Technology*, May 18–20, 1993, pp. 714–717.

Ming–Ju Ho et al, "Capacity and Power Control for CDMA Microcells", *Wireless Networks*, vol. 1, No. 3, Oct. 1995, pp. 355–363.

*Primary Examiner*—Thomas Mullen
*Attorney, Agent, or Firm*—Russell B. Miller; Thomas M. Thibault

[57] ABSTRACT

In a dispatch system, power of the forward link broadcast channel transmitted from a base station is controlled such that the power level is the minimum necessary and such that transmission of the forward link broadcast channel is terminated if no remote unit is located within the coverage area of the base station. In addition to transmitting a forward link broadcast signal, the base station monitors an access channel. A first remote unit in the base station coverage area receives and decodes the forward link broadcast signal. The first remote unit determines a signal quality of said forward link broadcast signal. If the signal quality is unacceptable, the remote unit transmits a power request access message. The base station responds to the request by increasing the transmission power of forward link broadcast channel. If no requests are received at the base station, the forward link broadcast channel is slowly decreased to a minimum. Transmission of the forward link broadcast channel may be terminated completely.

15 Claims, 2 Drawing Sheets

METHOD AND APPARATUS OF POWER CONTROL IN A CDMA DISPATCH SYSTEM

BACKGROUND OF THE INVENTION

This invention was made with Government support under MDA904-94-C-C-116 awarded by the National Security Agency.

I. FIELD OF THE INVENTION

This invention relates generally to power control in a multiple access system and, more particularly, to power control on a forward link broadcast channel signal.

II. DESCRIPTION OF THE RELATED ART

In a wireless telephone communication system, many users communicate over a wireless channel to connect to other wireless and wireline telephone systems. Communication over the wireless channel can be one of a variety of multiple access techniques. These multiple access techniques include time division multiple access (TDMA), frequency division multiple access (FDMA), and code division multiple access (CDMA). The CDMA technique has many advantages. An exemplary CDMA system is described in U.S. Pat. No. 4,901,307 issued Feb. 13, 1990 to K. Gilhousen et al., entitled "SPREAD SPECTRUM MULTIPLE ACCESS COMMUNICATION SYSTEM USING SATELLITE OR TERRESTRIAL REPEATERS," assigned to the assignee of the present invention and incorporated herein by reference.

In the just mentioned patent, a multiple access technique is disclosed where a large number of mobile telephone system users, each having a transceiver, communicate through satellite repeaters, airborne repeaters, or terrestrial base stations using CDMA spread spectrum communication signals. In using CDMA communications, the frequency spectrum can be reused multiple times permitting an increase in system user capacity.

In the CDMA cellular system, each base station provides coverage to a limited geographic area and links the remote units in its coverage area through a cellular system switch to the public switched telephone network (PSTN). When a remote unit moves to the coverage area of a new base station, the routing of the remote unit's call is transferred to the new base station. The base station-to-remote unit signal transmission path is referred to as the forward link and the remote unit-to-base station signal transmission path is referred to as the reverse link.

In an exemplary CDMA system, each base station transmits a pilot signal having a common pseudorandom noise (PN) spreading code that is offset in code phase from the pilot signal of other base stations. During system operation, the remote unit is provided with a list of code phase offsets corresponding to neighboring base stations surrounding the base station through which communication is established. The remote unit is equipped with a searching element with which it tracks the signal strength of the pilot signal from a group of base stations including the neighboring base stations.

A method and system for providing communication with a remote unit through more than one base station during the handoff process are disclosed in U.S. Pat. No. 5,267,261, entitled "MOBILE ASSISTED SOFT HANDOFF IN A CDMA CELLULAR COMMUNICATION SYSTEM," issued Nov. 30, 1993 assigned to the assignee of the present invention. Using this system, communication between the remote unit and the end user is uninterrupted by the eventual handoff from an original base station to a subsequent base station. This type of handoff may be considered a "soft" handoff in that communication with the subsequent base station is established before communication with the original base station is terminated. When the remote unit is in communication with two base stations, the remote unit combines the signals received from each base station in the same manner that multipath signals from a common base station are combined.

In a typical macrocellular system, a system controller may be employed to create a single signal for the end user from the signals received by each base station. Within each base station, signals received from a common remote unit may be combined before they are decoded and thus take full advantage of the multiple signals received. The decoded result from each base station is provided to the system controller. Once a signal has been decoded it cannot be 'combined' with other signals. Thus the system controller must select between the plurality of decoded signals produced by each base station with which communication is established by a single remote unit. The most advantageous decoded signal is selected from the set of signals from the base stations and the unchosen signals are simply discarded.

Remote unit assisted soft handoff operates based on the pilot signal strength of several sets of base stations as measured by the remote unit. The Active Set is a set of base stations through which active communication is established. The Candidate Set is a set of base stations chosen from the Neighbor Set or the Remaining Set having a pilot signal strength at a sufficient signal level to establish communication. The Neighbor Set is a set of base stations surrounding an active base station comprising base stations that have a high probability of having a signal strength of sufficient level to establish communication. The Remaining Set comprises all base stations in the system which are not members of the Active, Candidate, or Neighbor Sets.

When communication is initially established, a remote unit communicates through a first base station and the Active Set contains only the first base station. The remote unit monitors the pilot signal strength of the base stations of the Active Set, the Candidate Set, the Neighbor Set, and the Remaining Set. When a pilot signal of a base station in the Neighbor Set or Remaining Set exceeds a predetermined threshold level, the base station is added to the Candidate Set. The remote unit communicates a message to the first base station identifying the new base station. A system controller decides whether to establish communication between the new base station and the remote unit. Should the system controller decide to do so, the system controller sends a message to the new base station with identifying information about the remote unit and a command to establish communications therewith. A message is also transmitted to the remote unit through the first base station. The message identifies a new Active Set that includes the first and the new base station. The remote unit searches for the new base station transmitted information signal and communication is established with the new base station without termination of communication through the first base station. This process can continue with additional base stations.

When the remote unit is communicating through multiple base stations, it continues to monitor the signal strength of the base stations of the Active Set, the Candidate Set, the Neighbor Set, and the Remaining Set. Should the signal strength corresponding to a base station of the Active Set drop below a predetermined threshold for a predetermined period of time, the remote unit generates and transmits a message to report the event. The system controller receives this message through at least one of the base stations with which the remote unit is communicating. The system controller may decide to terminate communications through the base station having a weak pilot signal strength.

The system controller upon deciding to terminate communications through a base station generates a message identifying a new Active Set of base stations. The new Active Set does not contain the base station through which communication is to be terminated. The base stations through which communication is established send a message to the remote unit. The system controller also communicates information to the base station to terminate communications with the remote unit. The remote unit communications are thus routed only through base stations identified in the new Active Set.

Because the remote unit is communicating with the end user though at least one base station at all times throughout the soft handoff process, no interruption in communication occurs between the remote unit and the end user. A soft handoff provides significant benefits in its inherent "make before break" technique over the conventional "break before make" technique employed in other cellular communication systems.

In a wireless telephone system, maximizing the capacity of the system in terms of the number of simultaneous telephone calls that can be handled is extremely important. System capacity in a spread spectrum system can be maximized if the transmission power of each remote unit is controlled such that each transmitted signal arrives at the base station receiver at the same level. In an actual system, each remote unit may transmit the minimum signal level that produces a signal-to-noise ratio that allows acceptable data recovery. If a signal transmitted by a remote unit arrives at the base station receiver at a power level that is too low, the bit-error-rate may be too high to permit high quality communications due to interference from the other remote units. On the other hand, if the remote unit transmitted signal is at a power level that is too high when received at the base station, communication with this particular remote unit is acceptable but this high power signal acts as interference to other remote units. This interference may adversely affect communications with other remote units.

Therefore to maximize capacity in an exemplary CDMA spread spectrum system, the transmit power of each remote unit within the coverage area of a base station is controlled by the base station to produce the same nominal received signal power at the base station. In the ideal case, the total signal power received at the base station is equal to the nominal power received from each remote unit multiplied by the number of remote units transmitting within the coverage area of the base station plus the power received at the base station from remote units in the coverage area of neighboring base stations.

The path loss in the radio channel can be characterized by two separate phenomena: average path loss and fading. The forward link, from the base station to the remote unit, operates on a different frequency than the reverse link, from the remote unit to the base station. However because the forward link and reverse link frequencies are within the same general frequency band, a significant correlation between the average path loss of the two links exists. On the other hand, fading is an independent phenomenon for the forward link and reverse link and varies as a function of time.

In an exemplary CDMA system, each remote unit estimates the path loss of the forward link based on the total power at the input to the remote unit. The total power is the sum of the power from all base stations operating on the same frequency assignment as perceived by the remote unit. From the estimate of the average forward link path loss, the remote unit sets the transmit level of the reverse link signal. Should the reverse link channel for one remote unit suddenly improve compared to the forward link channel for the same remote unit due to independent fading of the two channels, the signal as received at the base station from this remote unit would increase in power. This increase in power causes additional interference to all signals sharing the same frequency assignment. Thus a rapid response of the remote unit transmit power to the sudden improvement in the channel would improve system performance. Therefore it is necessary to have the base station continually contribute to the power control mechanism of the remote unit.

Remote unit transmit power may also be controlled by one or more base stations. Each base station with which the remote unit is in communication measures the received signal strength from the remote unit. The measured signal strength is compared to a desired signal strength level for that particular remote unit. A power adjustment command is generated by each base station and sent to the remote unit on the forward link. In response to the base station power adjustment command, the remote unit increases or decreases the remote unit transmit power by a predetermined amount. By this method, a rapid response to a change in the channel is effected and the average system performance is improved. Note that in a typical cellular system, the base stations are not intimately connected and each base station in the system is unaware of the power level at which the other base stations receive the remote unit's signal.

When a remote unit is in communication with more than one base station, power adjustment commands are provided from each base station. The remote unit acts upon these multiple base station power adjustment commands to avoid transmit power levels that may adversely interfere with other remote unit communications and yet provide sufficient power to support communication from the remote unit to at least one of the base stations. This power control mechanism is accomplished by having the remote unit increase its transmit signal level only if every base station with which the remote unit is in communication requests an increase in power level. The remote unit decreases its transmit signal level if any base station with which the remote unit is in communication requests that the power be decreased. A system for base station and remote unit power control is disclosed in U.S. Pat. No. 5,056,109 entitled "METHOD AND APPARATUS FOR CONTROLLING TRANSMISSION POWER IN A CDMA CELLULAR MOBILE TELEPHONE SYSTEM," issued Oct. 8, 1991, assigned to the Assignee of the present invention.

It is also desirable to control the relative power used in each data signal transmitted by the base station in response to control information transmitted by each remote unit. The primary reason for providing such control is to accommodate the fact that in certain locations the forward channel link may be unusually disadvantaged. Unless the power being transmitted to the disadvantaged remote unit is increased, the signal quality may become unacceptable. An example of such a location is a point where the path loss to one or two neighboring base stations is nearly the same as the path loss to the base station communicating with the remote unit. In such a location, the total interference would be increased by three times over the interference seen by a remote unit at a point relatively close to its base station. In addition, the interference coming from the neighboring base stations does not fade in unison with the signal from the active base station as would be the case for interference coming from the active base station. A remote unit in such a situation may require 3 to 4 dB additional signal power from the active base station to achieve adequate performance.

At other times, the remote unit may be located where the signal-to-interference ratio is unusually good. In such a case, the base station could transmit the desired signal using a lower than normal transmitter power, reducing interference to other signals being transmitted by the system.

To achieve the above objectives, a signal-to-interference measurement capability can be provided within the remote unit receiver. This measurement is performed by comparing the power of the desired signal to the total interference and noise power. If the measured ratio is less than a predetermined value, the remote transmits a request to the base station for additional power on the forward link signal. If the ratio exceeds the predetermined value, the remote unit transmits a request for power reduction. One method by which the remote unit receiver can monitor signal-to-interference ratios is by monitoring the frame error rate (FER) of the resulting signal. Another way is by measuring the number of erasures declared as received.

The base station receives the power adjustment requests from each remote unit and responds by adjusting the power allocated to the corresponding forward link signal by a predetermined amount. The adjustment is typically small, such as on the order of 0.5 to 1.0 dB, or around 12%. The rate of change of power may be somewhat slower than that used for the reverse link, perhaps once per second. In the preferred embodiment, the dynamic range of the adjustment is typically limited such as from 4 dB less than nominal to about 6 dB greater than nominal transmit power.

The base station should also consider the power demands being made by other remote units in deciding whether to comply with the requests of any particular remote unit. For example, if the base station is loaded to capacity, requests for additional power may be granted, but only by 6% or less, instead of the normal 12%. In this regime, a request for a reduction in power would still be granted at the normal 12% change.

When the original cellular telephone licenses were issued by the government, one of the restrictions on use of the spectrum was that the carriers could not provide dispatching system services. However, because of the great advantages of the CDMA system and the inherent expense and problems of deployment and maintenance of private dispatch systems, the government is re-examining this issue. The government itself would benefit greatly from such services.

Whereas typical wireless and wireline telephone service provides point-to-point service, dispatching services provide one-to-many service. Common usage of dispatch services are local police radio systems, taxicab dispatch systems, Federal Bureau of Intelligence and secret service operations, and general military communication systems.

The basic model of a dispatch system consists of a broadcast net of users. Each broadcast net user monitors a common broadcast forward link signal. If a net user wishes to talk, he presses a push to talk (PTT) button. Typically the talking user's voice is routed from the reverse link over the broadcast forward link. Ideally the dispatch system allows landline and wireless access to the system.

Note that the power control mechanism for remote units acting as point-to-point units described above is not directly applicable to dispatch systems. In a dispatch system, a plurality of remote units are listening to the same forward link signal. In a dispatch system, the majority of the remote units are passive (i.e. just listening) at any one time. When a remote unit is passive, it does not have an established reverse link channel on which to transmit information to the base station. Therefore the present invention is a method and apparatus for controlling the forward link power control in a dispatch system.

SUMMARY OF THE INVENTION

The present invention is a method and apparatus by which passive dispatch units communicate power control requests to a base station transmitting a forward broadcast channel. The remote units transmit a request on an access channel if the remote unit experiences low signal quality. The base stations continually decrease the transmit power of the forward link broadcast channel if no power request access messages are received. If the base station reduced the power level of the forward link broadcast channel to a minimum level, the base station may discontinue transmission of the forward link broadcast channel. In this way, if no remote units are located within the coverage area of a base station the forward link broadcast channel transmission may be terminated. If a remote unit enters the coverage area of a base station which is not currently transmitting the forward link broadcast channel, the remote unit simply transmits a standard power request access message. The base station responds by beginning to transmit the forward link broadcast channel.

BRIEF DESCRIPTION OF THE DRAWINGS

The features, objects, and advantages of the present invention will become more apparent from the detailed description set forth below when taken in conjunction with the drawings wherein.

DESCRIPTION OF THE PREFERRED EMBODIMENT

Figure 1:
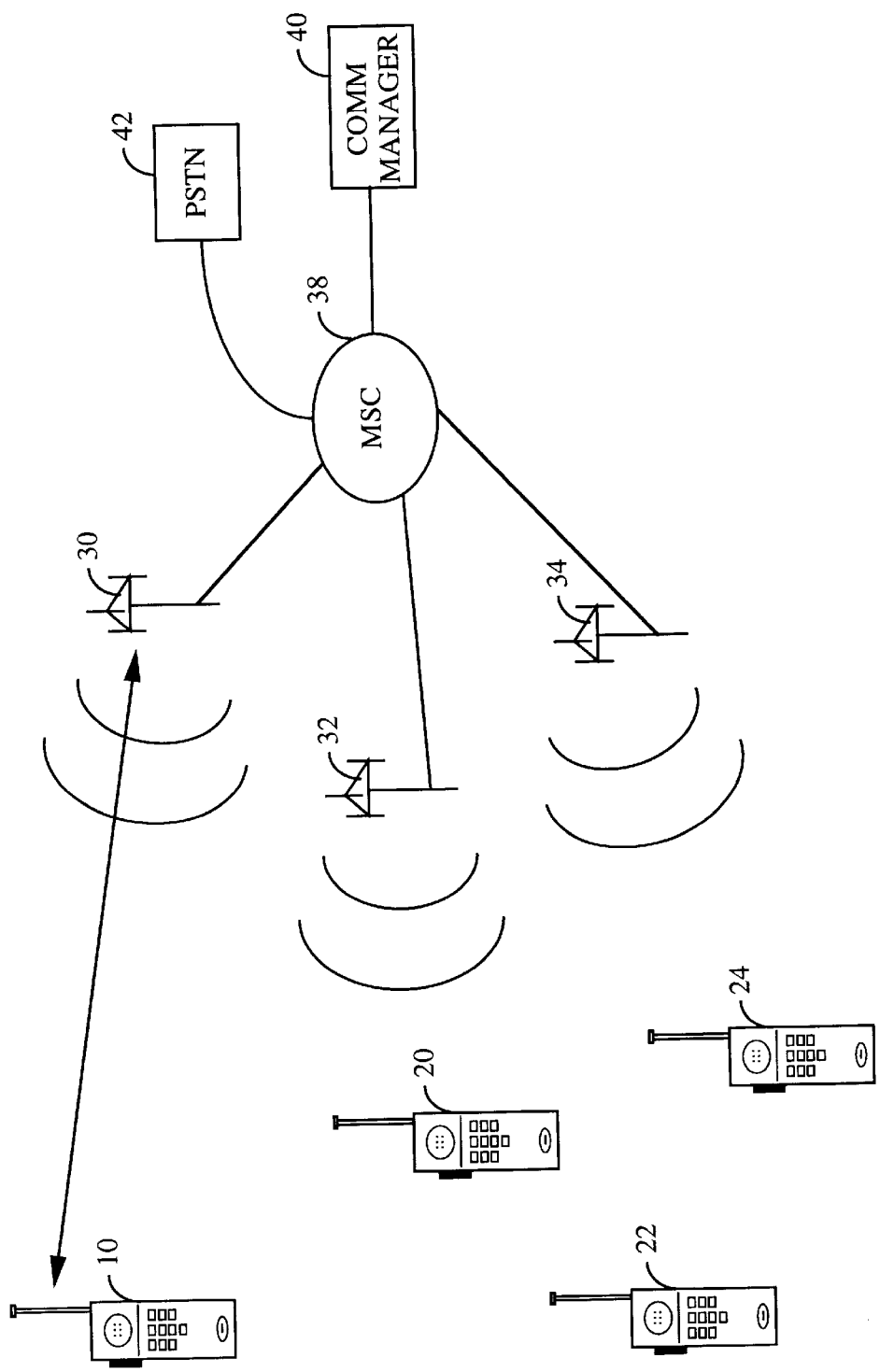
FIG. 1 shows a typical dispatch system.

FIG. 1 shows a typical dispatch system. In the preferred embodiment, remote units 10, 20, 22, and 24 may function both as dispatch units and as point-to-point telephones. In FIG. 1, remote unit 10 is currently an active talker and remote units 20, 22, and 24 are currently passive listeners. Base stations 30, 32, and 34 provide the broadcast forward link channel to remote units 20, 22, and 24. Base station 30 provides a dedicated traffic channel to remote unit 10. The dedicated traffic channel is similar to the forward link broadcast channel except that, for example, remote unit 10 may not receive his own speech signal. The dedicated traffic channel also comprises power control and signaling information. Base station 30 is also receiving a reverse link signal from active remote unit 10. Mobile switching center (MSC) 38 coordinates the signaling to and from the base stations. Communication manager 40 controls the net such as the prioritizing of requests if two of the remote units press the 'push to talk' (PTT) button at the same time. In the preferred embodiment, the air interface signaling and modulation is in accordance with the Code Division Multiple Access (CDMA) system described in "Mobile Station-Base Station Compatibility Standard for Dual-Mode Wideband Spread Spectrum Cellular Systems" TIA/EIA/IS-95, generally referred to simply as IS-95. In IS-95, the remote unit is referred to as a mobile station.

It is well known in the art that base stations may be sectorized such as into three sectors. Where the term base station is used herein, it is implied that the term may refer to an entire base station or to a single sector of a multisectored base station.

In FIG. 1 active remote unit 10 has an established bidirectional link with base station 30. In order to become active, remote unit 10 sends an access channel message requesting a traffic channel to base station 30. The access message is sent on the access channel. The access channel is a reverse link channel used by remote units for communicating to the base station. The access channel is used for short signaling message exchanges such as call originations, responses to pages, and registration. An access attempt is sent by the remote unit in a series of access probes. Each access probe carries the same information but is transmitted at a higher power level than the previous one. The access probes continue until a base station acknowledgment is received at the remote unit.

The access channel is a shared slotted random access channel. Only one remote unit can successfully use the access channel at one time. Also because each successive access probe is sent at an increased power level as compared to the previous one and the access channel is not power controlled, the access channel acts as interference to the other reverse link signals. For these reasons, it is advantageous to keep the number of access attempts to a minimum.

When remote unit 10 has established a communication link, it receives the signaling of the forward broadcast channel on a dedicated forward link traffic channel. In this way, remote unit 10 does not monitor the forward link broadcast channel and receives all of the dispatch system information on its own dedicated forward link traffic channel. Remote unit 10 communicates back to base station 30 on a dedicated reverse channel. In the preferred embodiment, power control on the forward and reverse links is performed as described above in accordance with IS-95. Because remote unit 10 has its own dedicated forward link signal path, remote unit specific messaging can be included in the signaling. For example, if remote unit 10 is capable of operating both as a dispatch system remote unit and as a point-to-point telephone unit, remote unit 10 can be informed on the forward link traffic channel that an incoming point-to-point call is being directed toward remote unit 10.

On the other hand, in FIG. 1, passive remote units 20, 22, and 24 do not have an established reverse link signal to any of the base stations. Note that if remote units 20, 22 and 24 are completely passive, the individual base stations may be unaware of whether the remote units are in their corresponding coverage areas. Even if a remote unit registers with the base station when it enters the coverage area of a base station, the base station has no way of knowing when the remote unit has left the base station coverage area.

Even if remote units 20, 22 and 24 are passive, they still may use the access channel to communicate with the base stations. In the preferred embodiment, passive remote units 20, 22 and 24 use the access channel to signal the base station if they are in need of more power from the forward link broadcast channel. Within the power request access message several signal level or quality indications may be included. For example there may be a field indicating the strength at which the remote unit perceives the pilot signal from the base station. Or there may be a field indicating the strength or quality at which the remote unit perceives the forward link broadcast channel. There may be a field indicating the signal strength or quality of both the pilot channel and the forward link broadcast channel. There may be a field which indicates the difference between or the ratio of the pilot signal strength to the forward link broadcast channel strength.

A standard cellular system is comprised of a plurality of base stations each of which provides communication for remote units located within a limited coverage area. Together the plurality of base stations provides coverage to an entire service area. When a dispatch system is leased by a leasing party, the leasing party may wish to provide coverage over the entire service area. However, if the forward link broadcast signal is transmitted from every base station in the system at all times, the cost of the system can be quite high. A more efficient and economical manner which provides higher overall capacity for the system is to transmit the forward link broadcast channel only in those base stations in which a remote unit is located and to transmit the forward link broadcast channel at the minimum level required to provide reliable communication.

If the forward link broadcast channel is not being transmitted, the corresponding resources are available for other point-to-point or broadcast users. In addition, the other users in the coverage area of the base stations which are not transmitting the forward link broadcast channel are not subject to interference therefrom. Remember that the pilot signal is transmitted continually from each base station without regard to whether the forward link broadcast channel is being transmitted.

Handoff of communication between base stations is also different in the broadcast mode than when the remote unit is operating as a point-to-point unit. As described in detail above, when a remote unit is operating as a point-to-point unit, handoff is controlled with reference to a set of pilot signal strength measurements made by the remote unit. The Active Set is a set of base stations through which active communication is established. The Candidate Set is a set of base stations chosen from the Neighbor Set or the Remaining Set having a pilot signal strength at a sufficient signal level to establish communication. The Neighbor Set is a set of base stations surrounding an active base station comprising base stations that have a high probability of having a signal strength of sufficient level to establish communication. The Remaining Set comprises all base stations in the system which are not members of the Active, Candidate, or Neighbor Sets.

When a remote unit is operating as a point-to-point unit, the Neighbor Set of base stations is preferred over the Remaining Set in that the pilot signals corresponding the Neighbor Set of base stations are searched at a higher frequency than the pilot signals corresponding to the Remaining Set. For example, in the preferred embodiment, first the entire Neighbor Set is searched and then one member of the Remaining Set is searched. Second the entire Neighbor Set is searched again and the next consecutive member of the Remaining Set is searched. Operation continues cyclically.

When a remote unit has an active point-to-point communication link established, the system controller located in the mobile switching center sends each remote unit a list of base stations which comprise the Neighbor Set. The Neighbor Set is dependent on the location of the remote unit. As such the Neighbor Set comprises a different set of base stations in one remote unit than it does in another. The system controller can send the individualized list of base stations for the Neighbor Set to the corresponding remote unit via the established forward link traffic channel.

Note however that in broadcast mode, the forward link broadcast channel is the same for all remote units and as such transmission of Neighbor Set information to each remote unit is not as elegant in broadcast mode. Also, because no reverse link is established with the remote units in broadcast mode, the system controller does not know the location of the remote units in order to determine a Neighbor Set. In the preferred embodiment of broadcast mode, the Neighbor Set of each remote unit operating in broadcast mode is empty. In this way a remote unit operating in broadcast mode searches directly from the Remaining Set continually as it monitors the forward link broadcast channel. If the pilot signal strength of a member of the Active Set falls below a threshold, T_DROP, for more than a specified amount of time, T_TDROP, the corresponding entry in the Active Set is deleted and a corresponding entry is added to the Remaining Set. The remote unit no longer monitors the forward link broadcast channel from the corresponding base station. Note that in this way, the use of the Candidate Set is also eliminated.

When the pilot signal of a base station which is a member of the Remaining Set exceeds a certain threshold, T_ADD, the remote unit may add a corresponding entry to the Active Set. The remote unit demodulates the forward link broadcast channel from that base station. The remote unit begins to diversity combine the signal from the newly added base station with the signals from other base stations that it is receiving. If the remote unit is unable to demodulate the forward link broadcast channel, it may send a power request access message to the base station.

Figure 2:
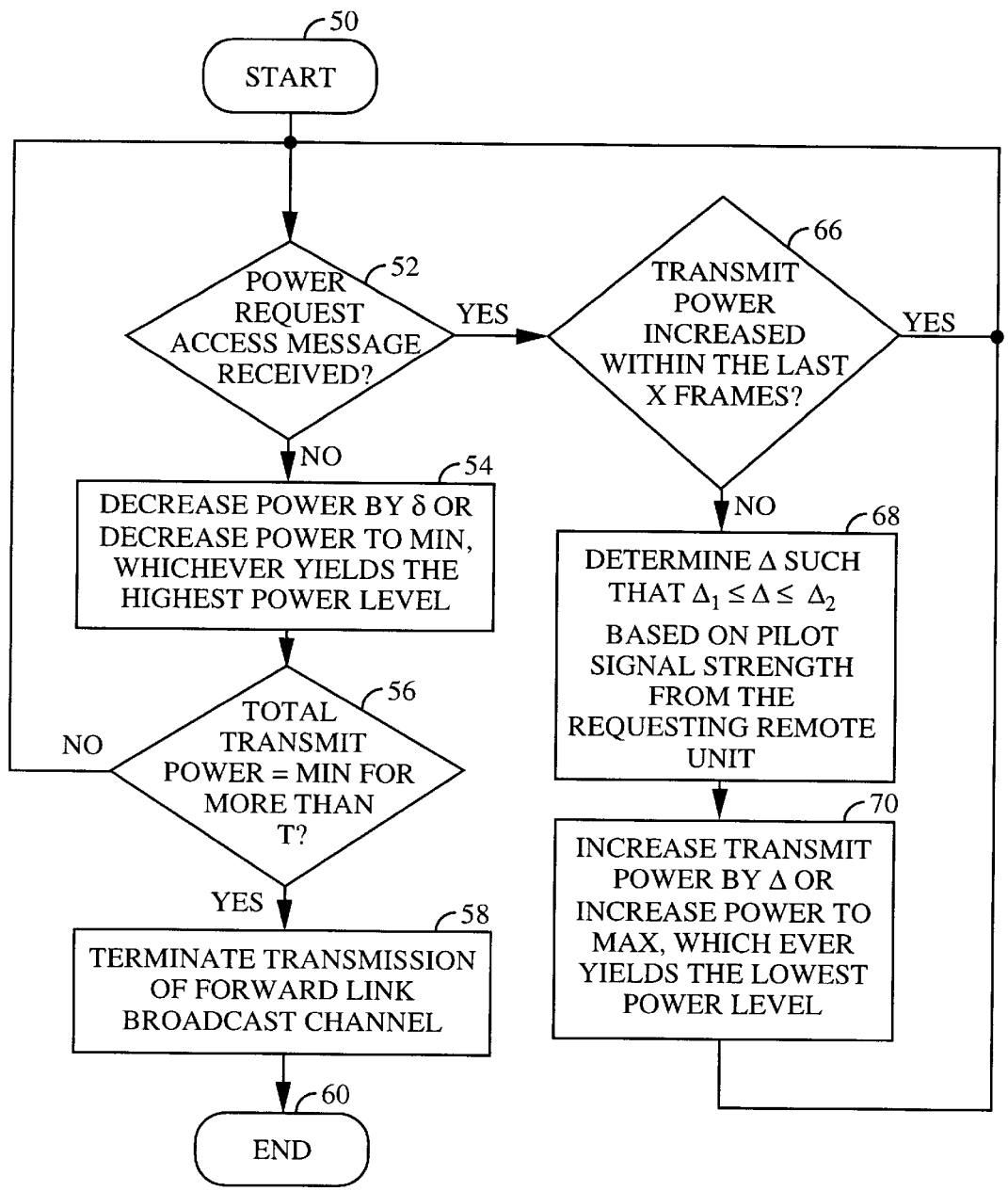
FIG. 2 is a flow chart illustrating forward broadcast channel power control in accordance with the present invention.

When a base station receives a power request access message when a forward link broadcast channel is not established, it informs the system controller which in response may command the base station to begin to transmit the forward link broadcast channel at an initially established level. The base station begins to execute power control in accordance with FIG. 2 beginning from start block 50. Block 52 in FIG. 2 is executed at predefined intervals. The intervals at which block 52 is executed sets the power control rate of operation. In block 52, the base station determines whether a power request access message has been received. If not, block 54 is executed which reduces the current transmit power by a predetermined amount, $\delta$, if doing so does not decrease the transmit power to less than a predefined minimum, MIN. Flow continues to block 56. In block 56, if the base station transmit power has been at a minimum for more than a predefined time interval, T, the transmission of the forward link broadcast channel is terminated as indicated in block 58 and execution of FIG. 2 ends as indicated in block 60. In this way, if all passive remote units exit the coverage area of a base station, the base station eventually eliminates transmission of the forward link broadcast channel by decreasing the transmit level to a minimum and transmitting at the minimum level for the predetermined duration, T. Returning again to block 56, if the transmit level has not been equal to the minimum for more than T, flow continues back to block 52.

If a power request access message is received, execution flows from block 52 to block 66. If the transmit power has been increased recently (e.g. within the last X frames), flow continues back to block 52 and the request is ignored. In this way, if two remote units request an increase in power in close succession to one another, the power is increased only once. If either remote unit needs yet more power, it may transmit another request. Therefore, the system does not unduly increase the forward link broadcast channel power level excessively to the detriment of other system users.

If the transmit power level has not been increased within the last X frames, the base station determines an amount, $\Delta$, by which to increase the power based on the strength at which the remote unit receives the base station pilot signal, block 68. If the remote unit is nearing the edge of coverage, it sends power request access messages to the base station to increase power. If it is moving out of the service area, the base station need no longer provide a signal to that remote unit. The amount, $\Delta$, is chosen between $\Delta_1$ and $\Delta_2$ based on the signal strength messages sent by the remote unit. For example, if a remote unit requests an increase in power and the difference in power level between the pilot signal and the forward link broadcast channel as measured by the remote unit is small, the size of $\Delta$ is less than if the difference in power levels is high. In block 70, the transmit power is increased by the amount, $\Delta$, or to the maximum transmit value, MAX, which ever yields the lower transmit power level. In this way the maximum transmit power of the base station is limited. From block 70, flow continues back to block 52. Obviously within the scope of the present invention is an alternative embodiment where the value of $\Delta$ is fixed.

Notice that the system parameters, T, MIN, and MAX, can be set by the leasing party in accordance with their needs and ability to pay. For example, if the Central Intelligence Agency, CIA, is performing a highly secret and dangerous mission, it may wish to have totally passive remote unit operation in which even the power request access message is not sent. In such a case, MIN and MAX are both set equal to full power and T is set to infinity. In this way all base stations in the system transmit continually at full power and the units in the coverage area may not need to send power request access messages.

The manner in which the remote unit determines that it needs more power is similar to the manner used in the remote unit operating in accordance with IS-95. For example, the remote unit may compare a frame erasure rate to a threshold. The remote unit may count the number of erasures within a sliding-window of frames. The remote unit may count the number of consecutive erasures. Any other link quality measurement such as signal to noise ratio, may be used to determine if the remote unit is in need of more power. If the pilot signal strength of the corresponding pilot signal is below T_DROP, the remote unit does not send a power request access message.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method of power control and efficient resource allocation of a base station in a dispatch system comprising the steps of:

monitoring a multiple user access communication channel to detect a request for increased power; and decreasing a power level at which a forward link broadcast signal is transmitted if no request for increased power is detected during a first period of time.

2. The method of claim 1 further comprising the step of increasing said power level at which said forward link broadcast signal is transmitted if said request for increased power is detected.

3. The method of claim 2 wherein said request for increased power comprises an indication of a signal level at which a corresponding remote unit received said forward link broadcast signal, and wherein an amount of power, by which said power level is increased in said step of increasing, is determined based on said indication.

4. The method of claim 3 wherein said indication is generated based on a frame erasure rate of a series of frames comprising said forward link broadcast signal.

5. The method of claim 3 wherein said indication is generated by measuring a signal to noise ratio of said forward link broadcast signal as received by said corresponding remote unit.

6. The method of claim 2 wherein the step of increasing said power level at which said forward link broadcast channel is transmitted is disabled if said power level reaches a maximum value.

7. The method of claim 1 further comprising the step of increasing said power level at which said forward link broadcast signal is transmitted only in response to one of two requests for increased power received in close succession.

8. The method of claim 1 wherein the step of decreasing said power level at which said forward link broadcast signal is transmitted is disabled, if said power level reaches a minimum value.

9. The method of claim 8 further comprising the step of terminating transmission of said forward link broadcast signal if said power level is equal to said minimum value for more than a second amount of time.

10. The method of claim 9 further comprising the step of resuming transmission of said forward link broadcast signal in response to a subsequently received request for increased power.

11. A system for conserving base station resources in a dispatch system configured to service remote units comprising:

a base station that monitors an access channel and cyclically reduces a power level of a forward link broadcast signal if no request for increased power is detected on said access channel; and a remote unit that receives said forward link broadcast signal and transmits said request for increased power if a signal level of said forward link broadcast signal crosses a threshold value.

12. An apparatus for power control and efficient resource allocation of a base station in a dispatch system comprising:

means for monitoring a multiple user access communication channel;

means for detecting a request for increased power over said multiple user access communication channel; and means for decreasing a power level at which a forward link broadcast signal is transmitted if no request for increased power is detected during a first period of time.

13. The apparatus of claim 12 further comprising means for increasing said power level at which said forward link broadcast signal is transmitted if said request for increased power is detected.

14. The apparatus of claim 13 wherein said request for increased power comprises an indication of a signal level at which a corresponding remote unit received said forward link broadcast signal and wherein an amount of power, by which said power level is increased, is determined based on said indication.

15. The apparatus of claim 12 further comprising means for increasing said power level at which said forward link broadcast signal is transmitted only in response to one of two requests for increased power received in close succession.

* * * * *